United States Patent [19]

Ichikawa

[11] Patent Number: 5,410,137
[45] Date of Patent: Apr. 25, 1995

[54] APPARATUS FOR REPRODUCING DATA FROM A TRACK WHOSE TRACK NUMBER CANNOT BE READ

[75] Inventor: Kaori Ichikawa, Koganei, Japan

[73] Assignee: Olympus Optical Co., Ltd., Tokyo, Japan

[21] Appl. No.: 161,089

[22] Filed: Dec. 3, 1993

Related U.S. Application Data

[63] Continuation of Ser. No. 878,982, May 6, 1992, abandoned.

[30] Foreign Application Priority Data

May 9, 1991 [JP] Japan .................. 3-104380

[51] Int. Cl.⁶ .......................... G06K 7/10; G11B 7/08
[52] U.S. Cl. .................... 235/436; 235/454; 369/44.32
[58] Field of Search ............... 235/454, 437, 436; 369/44.32

[56] References Cited

U.S. PATENT DOCUMENTS

| | | | |
|---|---|---|---|
| 4,598,393 | 7/1986 | Pierce et al. | 235/454 |
| 4,730,293 | 3/1988 | Pierce et al. | 369/44 |
| 4,742,214 | 5/1988 | Kobayashi | 235/454 |
| 4,896,025 | 1/1990 | Hasegawa | 235/454 |
| 4,910,725 | 3/1990 | Drexler et al. | 235/454 |
| 4,998,009 | 3/1991 | Iijima et al. | 235/454 |
| 5,018,124 | 5/1991 | Ogasawara et al. | 235/454 |
| 5,113,061 | 5/1992 | Tanaka | 235/454 |
| 5,128,917 | 7/1992 | Kiyoshi | 235/454 |
| 5,132,522 | 7/1992 | Oshiba | 235/454 |
| 5,144,610 | 9/1992 | Hiriguchi | 235/454 |
| 5,187,698 | 2/1993 | Hirofumi | 235/454 |

FOREIGN PATENT DOCUMENTS 2-141932 5/1990 Japan .

Primary Examiner—Donald Hajec
Assistant Examiner—Edward Sikorski
Attorney, Agent, or Firm—Armstrong, Westerman, Hattori, McLeland & Naughton

[57] ABSTRACT

A data reproducing apparatus for reproducing information recorded in at least one track formed on a recording medium. The data reproducing apparatus includes at least one track number reading device for reading out the track number of at least one track formed on the recording medium; a designating controlling device for specifying a track having a track number which cannot be read out from among the track numbers of tracks which can be read out, and for designating an information reading starting position on the track; and a data reading device for reading out information on at least one track on the basis of the information reading starting position on the track designated by the designating controlling device.

11 Claims, 3 Drawing Sheets

APPARATUS FOR REPRODUCING DATA FROM A TRACK WHOSE TRACK NUMBER CANNOT BE READ

This application is a continuation of application Ser. No. 07/878,982 filed May 6, 1992, now abandoned.

BACKGROUND OF THE INVENTION

1. Field of the Invention

This invention relates to a data reproducing apparatus for reading information out of a plurality of tracks of a recording medium.

2. Related Art and Prior Art Statement

Conventional recording media are floppy discs and hard discs which record and reproduce data by using magnetism and optical discs and optical cards which record and reproduce data by using light and they can record large volumes of data. On these recording media, the data are properly divided in response to the lengths of the tracks and are recorded as pit rows along the tracks. For example, the respective tracks are formed adjacently in parallel. Also, in the optical discs, for example, the tracks are Spirally formed and therefore the respective tracks are peripherally formed in parallel. Each track has a data region in which a track number is recorded and, after this track number, data are recorded.

Now, in the case of reproducing the data recorded on the above mentioned recording media, as it is general that the tracks on the recording media are read in one by one and the data are reproduced, a plurality of adjacent tracks will be simultaneously read in and the data will be able to be reproduced.

Usually, in the data reproducing apparatus, in the case of reading data, a seeking operation will be made. In this seeking operation, a reading head is moved toward an objective track, then, while rotating (in the case of a disc-like medium) or reciprocating (in the case of a card-like medium) the medium, focusing or tracking is made, the read signal of "0" or "1" of the information recorded on the recording medium is binary value generated, the binary value generated reproduced signal is demodulated and the track number of the above mentioned track is thereby read in and confirmed. When the seeking operation is completed and this track is the objective track, the data of this track will be read. In case it is not the objective track, seeking will be made anew. In case the objective track number can not be read in as a result of making a provided number of seeks, for example, due to a flaw or dirt on the medium, a seeking error will be made and the data also will not be able to be read. In such case, even if there is no error in the data, the reading will be also impossible.

The case of simultaneously reading in a plurality of tracks is also the same. When a plurality of tracks are simultaneously read and an operation of independently reading in all the tracks is made, in case the track number can not be read in, the data of this track also will not be able to be read in. For example, as mentioned in the publication of Japanese patent application laid open No.141932/1990, there is disclosed an apparatus for reading in data by simultaneously radiating light spots to a plurality of tracks. In this apparatus, it is into one track part that the read signal is instantaneously read and the data of the rest of the tracks are recorded in a memory.

Therefore, when the track number of the track instantaneously read in can not be read, the objective reproducing position will not be able to be guaranteed, a seeking error will be made and it will not be permitted to read in the data.

As described above, in the conventional data reproducing apparatus of a system of reading in one track, there is a defect that, in case the track number of the moving end can not be read out due to a flaw or dirt on the recording medium, the data also will not be able to be read. Also, as in the apparatus mentioned in the above mentioned publication, even if the system of simultaneously reading in a plurality of tracks is adopted, if the track number of the track instantaneously read in can not be read, after all the data will not be able to be read in. This fact leaves a space to be improved.

OBJECTS AND SUMMARY OF THE INVENTION

An object of this invention is to provide a data reproducing apparatus for reading information out of a plurality of tracks of a recording medium wherein, irrespective of whether the objective track number can be read or not, the data of this track can be read in.

Another object of this invention is to provide a data reproducing apparatus for reading information out of one track of a recording medium wherein, irrespective of whether the objective track number can be read or not, the data of this track can be read in.

Further another object of this invention is to provide a data reproducing apparatus wherein, in case an objective track number can not be read in a recording medium having a plurality of tracks, the track number of this track will be presumed and the data will be able to be read in.

Briefly the present invention is a data reproducing apparatus for reproducing information recorded in at least one track formed on a recording medium, comprising at least one track number reading means reading out the track number of at least one track formed on the above mentioned recording medium, a designating controlling means specifying, for example, relatively a track whose track number can not be read out from among track numbers of tracks which can be read out and designating an information reading starting position on the track and a data reading means reading out the information on at least one track on the basis of the information reading starting position on the track designated by the above mentioned designating controlling means.

The other features and advantages of the present invention will become apparent enough with the following detailed explanation.

DETAILED DESCRIPTION OF THE PREFERRED EMBODIMENTS

The first embodiment of the present invention shall be explained with reference to FIGS. 1 to 4.

Figure 3:
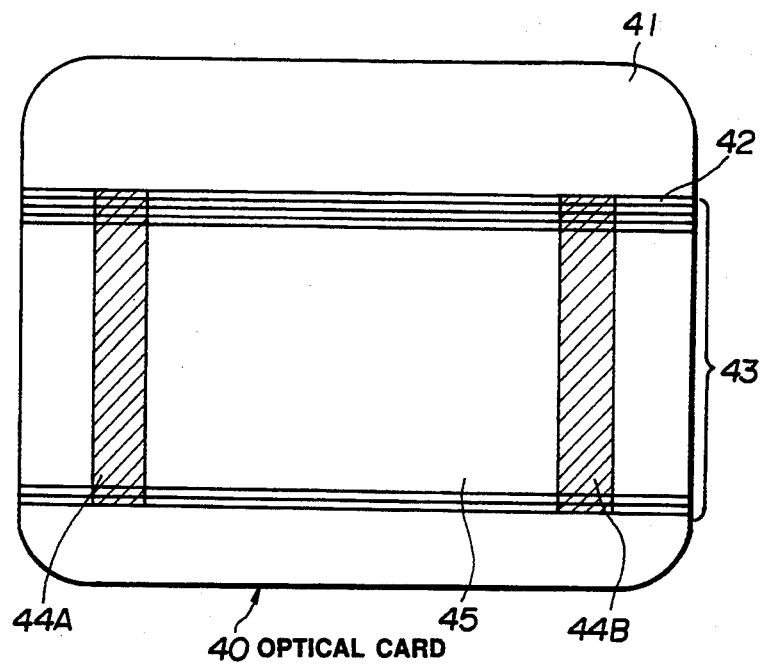
FIG. 3 is a schematic formation view of an optical card.

As shown in FIG. 3, an optical card 40 as a recording medium has a plurality of tracks 42 extended in the major side direction of the card, is provided with a recording region 43 in which a plurality of the tracks 42 are formed in the width direction (minor side direction) of the card. This recording region 43 is provided with ID parts 44A and 44B recording such informations as addresses corresponding to the respective tracks near both ends of the major side of the card so as to be read in both directions opposed to each other and has a data region 45 in which informations are written inside these ID parts 44A and 44B. In a later described data reproducing apparatus, for example, when the card is moving from left to right in the drawing in the track direction with respect to an optical head not illustrated, the ID part 44A will be read out so that the address informations corresponding to the tracks may be recognized. Also, when the optical card 40 is moving from right to left in the drawing in the track direction, the ID part 44B will be read out so that the track informations corresponding to the tracks may be recognized. By the way, the ID parts 44A and 44B are provided at fixed distances (for example, about 4 mm) inside the ends of the card so that the card end parts may be prevented from being influenced by flaws or dirts and the relative speed in the track direction of the optical card 40 and optical head may be well stabilized. Further, the ID parts 44A and 44B are pre-formated in advance when the optical card is made.

Figure 1:
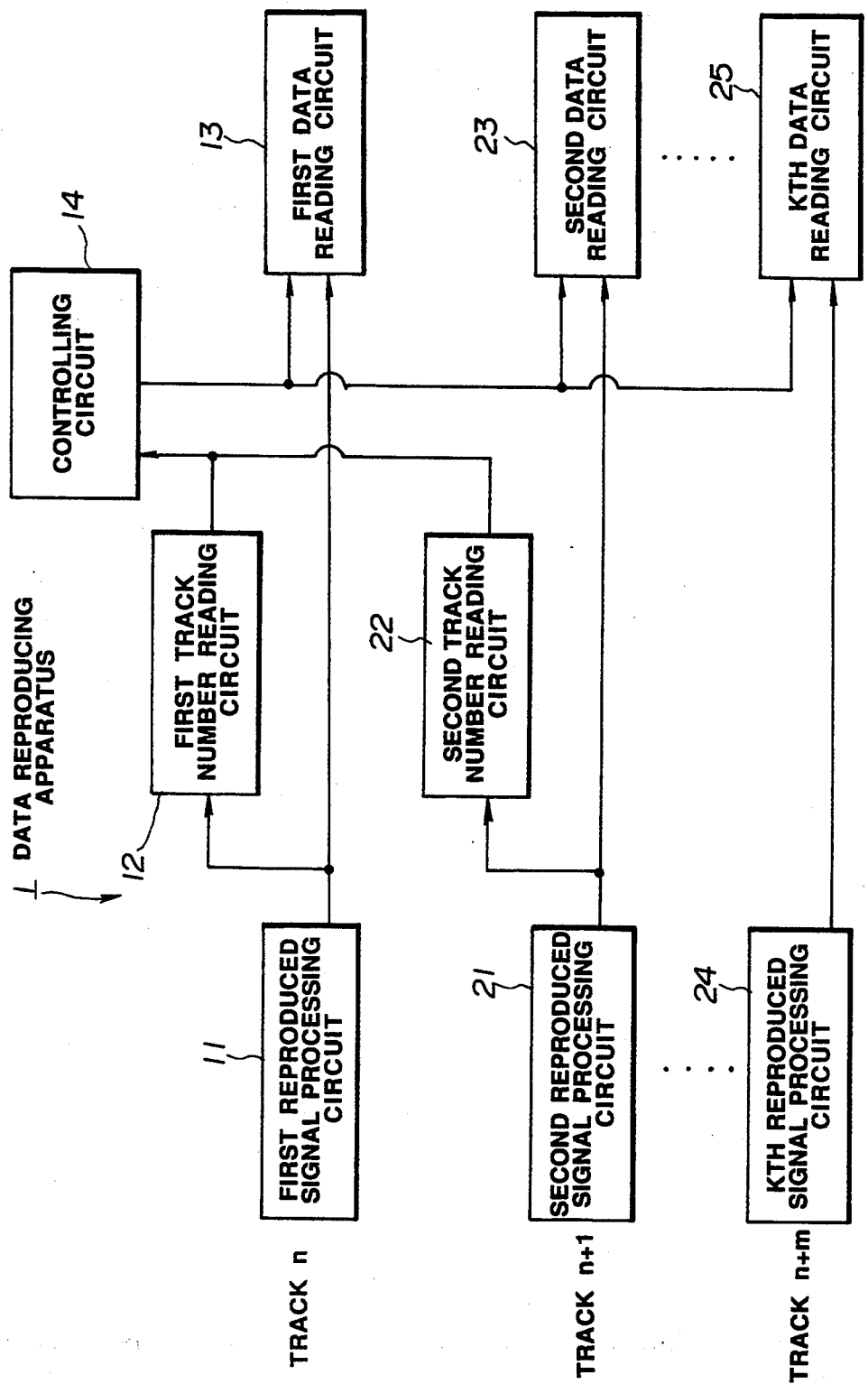
FIG. 1 is schematic formation diagram of a data reproducing apparatus of the first embodiment.
Figure 2:
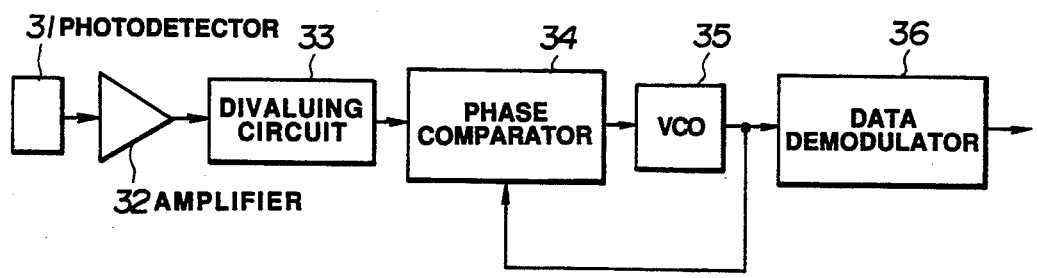
FIG. 2 is a schematic formation diagram of a reproduced signal processing circuit.

A data reproducing apparatus 1 shown in FIG. 1 has an optical head not illustrated radiating a recording/reproducing light to the optical card 40. This optical head projects a light spot on the optical card 40 through an optical system consisting of a light source and objective lens not illustrated. A photodetector 31 shown in FIG. 2 is provided, for example, within the above mentioned optical head, converts the reflected light from the optical card 40 to an electric signal and outputs it as an information reproducing signal. The data reproducing apparatus 1 is provided with a plurality of reproduced signal processing circuits making such processes as binary value generating and demodulating the above mentioned information reproduced signal output by the above mentioned photodetector 31.

In FIG. 2 is shown an example of reproduced signal processing circuit which has an amplifier 32 amplifying the information reproduced signal output by the photodetector 31 and outputting the amplified information reproduced signal to a divaluing circuit 33 which binary value generates the amplified information reproduced signal and outputs it to a phase comparator 34. The above mentioned phase comparator 34 and a VCO (voltage controlled oscillator) 35 form a loop for a later described VFO clock to positively follow the fluctuation of the binary value generated signal. The above mentioned phase comparator 34 compares the phases of the binary value generated signal output by the above mentioned binary generated circuit 33 and the VFO clock generated by the VCO 35 and gives the phase difference to the VCO 35 which changes the frequency of the generated VFO clock by the given phase difference and follows the fluctuation of the binary value generated signal. A demodulator 36 demodulates the binary value generated signal with the VFO clock and converts it to digital data.

FIG. 1 shows a data reproducing apparatus 1 which has a first reproduced signal processing circuit 11 and second reproduced signal processing circuit 21 to kth reproduced signal processing circuit 24 so that k tracks may be simultaneously read out wherein the value of k is set by considering both of the economy and reliability. By the way, k is of a value (natural number) of 2 or larger. The above mentioned optical head servo-controls tracking and focusing the light spot by an actuator or the like not illustrated and moves to any desired track.

To the above mentioned first reproduced signal processing circuit 11 and second reproduced signal processing circuit 21 to (k−1)th reproduced signal processing circuit not illustrated are respectively connected a first track number reading circuit 12 and second track number reading circuit 22 to (k−1)th track number reading circuit not illustrated. Further, the first reproduced signal processing circuit 11 and second reproduced signal processing circuit 21 to kth reproduced signal processing circuit 24 are connected respectively to a first data reading circuit 13 and second data reading circuit 23 to kth data reading circuit 25. The above mentioned first to (k−1)th respective track number reading circuits read respective track numbers out of the signals output by the respective reproduced signal processing circuits, output reading end signals showing the reading completion and output the respective read track (address) numbers to a controlling circuit 14 as a designating controlling means. The controlling circuit 14 receives the reading end signal and outputs data reading starting position signals respectively to the first data reading circuit 13 and second data reading circuit 23 to kth data reading circuit 25. In case the data reading starting position signals output by the controlling circuit 14 are received, the first data reading circuit 13 and second data reading circuit 23 to kth data reading circuit 25 will be able to recognize the data reading starting position and will be able to read the respective data of the tracks n and (n+1) to (n+m) out of the respective demodulated information reproduced signals output by the respective reproduced signal processing circuits 11, 21, . . . and 24.

In this formation, the respective photodetectors 31 of the reproduced signal processing circuits 11, 21, . . . and 24 convert the reflected lights from the optical card to electric signals and an amplifier 32 amplifies the electric signals and outputs them to a binary value generating circuit 33 which converts the analogue signals to binary value generating signals of "0" and "1" with a proper threshold value. The phase comparator 34 compares the phases of the clock generated by the VCO 35 and the binary value generated signal and gives the phase difference to a VCO 35 which changes the frequency of the generated clock by the given phase difference so as to follow such fluctuation as the jittering of the binary value generated signal. A demodulating circuit 36 demodulates the binary value generated signal with the VFO clock, converts it to digital data and output them.

By the way, the above mentioned reproduced signal processing circuit is prepared for all the tracks to be read out. However, as shown in the publication of Japanese patent application laid open No.141932/1990, the reproduced signal processing circuit may be prepared for only a part of tracks and a memory may be substituted on the rest of the tracks so that the reproduced signal processing circuit may be omitted.

Figure 4:
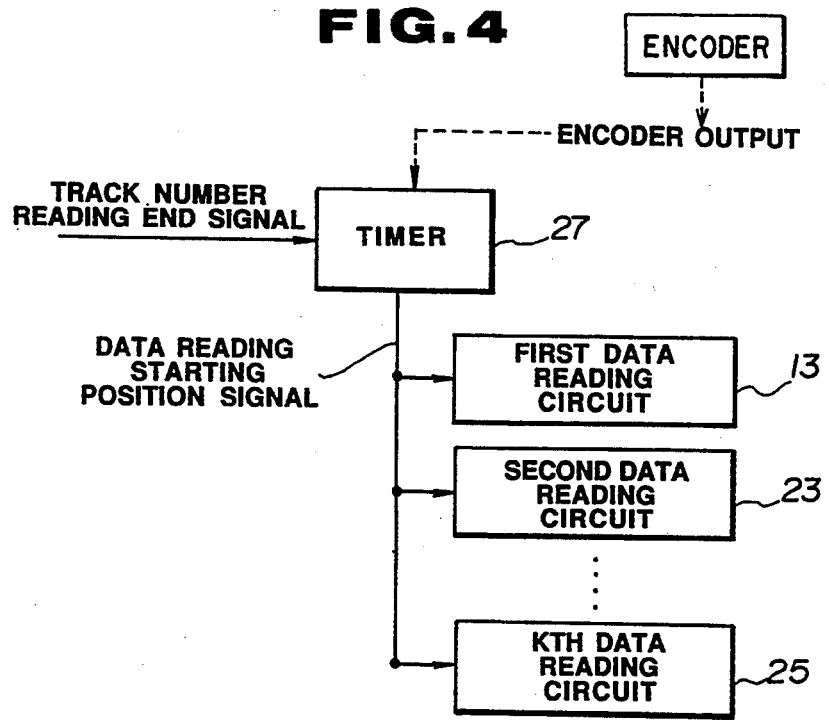
FIG. 4 is a block diagram including a timer built-in in a controlling circuit.

Further, in the above mentioned formation, in order that the track numbers of the tracks may be read out and the data may be reproduced, the information reproduced signal from the medium input into the first reproduced signal processing circuit 11 is divalued and demodulated and is then output to the first track number reading circuit 12 which reads the track number out of the above mentioned information reproduced signal and then outputs to the controlling circuit 14 the read track number n and the track number reading end signal. In the same manner, the reproduced signal from the adjacent track (n+1) is fed to the second track number reading circuit 22 from the second reproduced signal processing circuit 21. In case the track number can be read out, the second track number reading circuit 22 will output the read track number (n+1) and the track number reading end signal to the controlling circuit 14 which will receive the track number reading end signal and will output the data reading starting position signals to the data reading circuits 13, 23, . . . and 25. The distance between the starting position in which the track number is written within the ID part and the starting position in the data region on the optical card is set as a fixed value. When the relative speed of the optical card and photodetector is fixed and the track number and data within the above mentioned ID part are read out, in a position at a fixed distance separated from the track number writing starting position, a track number reading end signal will be generated. Therefore, the time interval since the track number reading end signal is generated until the data region reading is started can be determined by calculation in advance. Therefore, when a timer 27 which is shown in FIG. 4 and in which the time from the generation of the track number reading end signal to the data reading starting position signal is determined by calculation and is measured is provided within the controlling circuit 14, the output of the timer 27 will be able to be made a data reading starting signal. By the way, the relative speed of the optical card and photodetector may be actually measured by such known sensing means as an encoder. Generally, in the case of reading data, the above mentioned photodetector will be stopped and the optical card 40 will be driven in the track direction. Therefore, the timer 27 will generate a data reading starting position signal in response to the encoder output indicated by the broken line in FIG. 4, that is, to the actually measured relative speed. In this example, as the relative speed is not fixed but is actually measured, the data reading starting position signal can be generated at a more positive timing.

The respective data reading circuits 13, 23, and 25 start data reading on the basis of the data reading starting position signal. The data reading circuits 13, 23, . . . and 25 are memories. The data reading operation is an operation of storing in these memories the demodulated signals from the data region demodulated by the respective reproduced signal processing circuits. That is to say, when a data reading starting position signal is generated and is recognized to be effective data (demodulated signal), it will be stored in the memory.

According to this embodiment, substantially at the same timing, the track numbers of n to (n+k−1) are read out and the track number reading signals corresponding to the respective track numbers are also output. However, under the influence of a dirt or the like on the optical card 40, some of the track numbers may not be read out. When a track number can not be read out, the track number reading end signal for this track will not be generated. The controlling circuit 14 utilizes the earliest output of a plurality of input track number reading end signals, thereby starts measuring the timer within the controlling circuit 14 and outputs a data reading starting position signal. The data reading starting position signal of this embodiment is used in common in all the reading circuits 13, 23, . . . and 25. Now, the earliest track reading end signal will be used, for example, in case the same following signal is not generated or because it is the most positive signal easy to recognize.

As described above, in the apparatus of this embodiment, in case data are to be reproduced, even in case, of tracks in which k tracks have the track numbers simultaneously read out or tried to be read out by the first to kth track number reading circuits, the track number of a track can not be read out, on the basis of the track number of another track whose track number can be read out, the data will be permitted to be read in and will be able to be read out. At this time, the track whose track number can not be read in can be relatively specified by the number of the difference from the above mentioned other track. By the way, in the specification of the above mentioned track, the other track may be a plurality of tracks.

By the way, for example, if the track numbers of n and (n+2) can be read out, but the track number of (n+1) cannot be read out, the controlling circuit 14 will obtains the earliest among the track number reading end signals outputted from the respective track number reading circuits corresponding to the tracks of n and (n+2), and the controlling circuit 14 consequently drives the timer, and output a data reading starting position signal. On the basis of this starting position signal, the data in a data region 45 of the track number of (n+1) can then be read out. say, when a track number can not be read out, the demodulated signal of this track will be read out on the basis of the track number reading end signals obtained from the tracks of the two numbers nearest to its track number. By the way, in this case, on the track whose track number can be read out, the track number reading end signal obtained on the basis of this track number is made a reading criterion. In this case, as the track is read out on the basis of its own track number or the adjacent track number, a more accurate data reading timing will be able to be set. In this embodiment, for the track (n+k−1), that is, (n+m), no track number reading circuit is provided, because, in the track (n+k−1), the reading timing is always set by using the track number reading end signal of another track. The number of omitted track number reading circuits can be properly increased within a range in which the reliability can be secured.

Figure 5:
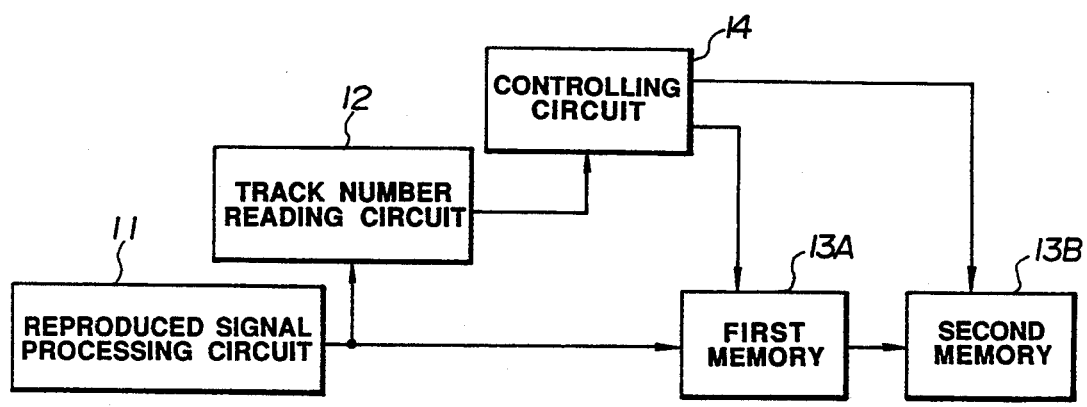
FIG. 5 is a block formation diagram of the second embodiment.

FIG. 5 shows a block diagram of the second embodiment of the present invention.

The formation of the reproducing optical card and the method of forming a divalued signal in the reproducing apparatus are the same as in the first embodiment and shall be omitted here. In the first embodiment, a plurality of tracks are to be simultaneously read in and n reproduced signal processing circuits 11 are provided for reproduction, whereas, in the apparatus of this second embodiment, as shown in FIG. 5, the reproduced signal processing circuit 11 is one in which the respective tracks are successively read in and processed. Also, this second embodiment has two memories instead of the above mentioned data reading circuit 13 of the first embodiment.

In the above mentioned formation, for example, the track n is reproduced, the divalued signal data processed by the reproduced signal processing circuit 11 are fed to the track number reading circuit 12 and are simultaneously demodulated and memorized as data of the track n in the first memory 13A. Here, if the track number can be read out, a track number reading end signal will be output to the controlling circuit (CPU) 14 from the track number reading circuit 12, the controlling circuit 14 will output a data reading starting signal to the first memory 13A and the data stored in the first memory 13A will be transferred to the second memory 13B storing the reading ended data. By the way, the timing of the data reading starting signal must be delayed by the processing time in the first memory 13A as compared with the case of the first embodiment. However, in case this processing time is negligible, the timing need not be delayed.

Here, in case the track number can not be read out, the data reading starting signal from the controlling circuit 14 will not be output and therefore the data will be preserved only in the first memory 13A. In such case, the head will move to the next track (n+1) and the data of this track will be read out. When the track number of this track can be normally read out by the track number reading circuit 12 and is fed to the controlling circuit 14, the track number n of the data preserved in the first memory 13A will be calculated by this track number and the number (one in this case) of the moving tracks of the head and the preserved data will be transferred as the data of the track n to the second memory 13B. Then, the above mentioned data will be stored in the second memory 13B and the reading will be completed. By the way, the moving distance of the head is made one in the above mentioned example but may be of any numerical value x. The track number n can be presumed from the value of the read track number (n+x) and the data can be effectively read in. Even if the track number of the track (n+1) can not be read, further another track number may be read out. The number of times need not be one but may be a plurality of times.

Even if the moving distance of the head is one track part, 100% correct movement will not be always made but, if the tracks before and after (+1 and −1) the track which can not be read out can be read out, the track will be able to be positively defined.

Thus, according to this embodiment, even if there is a track whose track number can not be read out, by presuming the track number of this track from the track number of the track which can be read out next, the data of the track whose track number can not be read out can be also effectively utilized.

By the way, the present invention has been explained by using the optical card as the recording medium in the above mentioned respective embodiments but can be also applied to a photodisc or the like.

In this invention, it is apparent that working modes different in a wide range can be formed on the basis of the spirit of the invention. This invention is not restricted by its specific working modes except being limited by the appended claims.

What is claimed is:

1. A data reproducing apparatus for reproducing information recorded in at least one track formed on a recording medium, comprising:

at least one track number reading means for reading out the track number of at least one track formed on said recording medium;

a designating controlling means for specifying a track having a track numbers thereof which cannot be read out from among the track numbers of tracks which can be read out, and designating an information reading starting position on the track; and a data reading means reading out information on at least one track on the basis of the information reading starting position on the track designated by said designating controlling means.

2. A data reproducing apparatus for reproducing information recorded in one track formed on a recording medium, comprising:

a track number reading means for reading the track number of one track formed on said recording medium;

a designating controlling means whereby, in case the tracks number of a objective track tried to be read out by said track number reading means cannot be read out, from the track numbers of another track which can be read out and the number of tracks moved from said objective track to said other track number, the track of said track number which cannot be read out is specified and an information reading starting position on the specified track is designated; and a data reading means for reading out the information on the track of the track number which cannot be read out on the basis of the information reading starting position on the track designated by said designating controlling means.

3. A data reproducing apparatus according to claim 2, wherein said data reading means includes:

a first memorizing means for storing the information of said objective track; and a second memorizing means for storing the information stored by said first memorizing means on the basis of the information reading starting position designated by said designating controlling means in case the track number of the objective track cannot be read out by said track number reading means.

4. A data reproducing apparatus for reproducing information recorded in a plurality of tracks formed on a recording medium, comprising:

a plurality of track number reading means for reading out the track number of a plurality tracks formed on said recording medium;

a designating controlling means for specifying a desired track from among a plurality of tracks of track numbers tried to be read out by said plurality of track number reading means from among a plurality of track number read out by said track number reading means and for designating an information reading starting position on the track; and at least one data reading means for reading information on at least one track on the basis of the information reading starting position on the track designated by said designating controlling means.

5. A data reproducing apparatus according to claim 4, wherein said designating controlling means specifies the desired track to be the track of the track number which cannot be read out by said track number reading means.

6. A data reproducing apparatus according to claim 4, wherein:

said track number reading means outputs a track number reading end signal to said designating controlling means in case the track number can be read out; and said designating controlling means includes a time measuring means for making a track number reading end signal input from said track number reading means a time measurement starting timing, for measuring the time from this time measurement start to an information reading starting position on said track, and for designating a reading starting position.

7. A data reproducing apparatus according to claim 6, further comprising a speed detecting means for measuring the relative speed of said recording medium and the optical head for reading out the information on said recording medium, wherein said time measuring means measures and designates the time in which an information reading starting position on said track is provided in response to the relative speed measured by said speed detecting means.

8. A data reproducing apparatus according to claim 6, wherein, by said time measuring means, in the case of relatively specifying a track having the track number thereof which cannot be read out in said track number reading means, a track number reading end signal, from a track adjacent to said track having the track number thereof which cannot be read out among a plurality of tracks having track numbers that can be read out by said plurality of track number reading means, is provided as a time measurement starting time.

9. A data reproducing apparatus according to claim 6, wherein said time measuring means makes the earliest input track number reading end signal a time measurement starting timing.

10. A data reproducing apparatus according to one of claims 1-2, or 4 wherein said track is relatively specified by the number of the difference from at least one track whose track number can be read out by said track number reading means.

11. An optical card data reproducing apparatus for reproducing a track number and information recorded in a data region from an optical card provided with a plurality of tracks having said track number corresponding to each track and said data region in which information is written, said optical card data reproducing apparatus comprising:

at least two track number reading means trying to simultaneously reproduce track numbers of at least two tracks whose track number is a number of all tracks in said optical card and less;

at least two data region information reproducing means simultaneously reproducing information in data regions in at least two tracks whose track number is a number of all tracks in said optical card and less;

memorizing means for memorizing data reproduced by said data region information reproducing means; and controlling means for deciding a beginning of transmission of information reproduced by said data region information reproducing means corresponding to tracks in which track number could not be reproduced on a basis of output of said track number reproducing means in which track numbers could be reproduced to said memorizing means by regarding said information effective.

* * * * *